United States Patent [19]

Kazama

[11] Patent Number: 5,572,490
[45] Date of Patent: Nov. 5, 1996

[54] E-TYPE MAGNETIC HEAD FOR MAGNETO-OPTICAL RECORDING DEVICE

[75] Inventor: Toshio Kazama, Nagaoka, Japan

[73] Assignee: Alps Electric Co., Ltd., Tokyo, Japan

[21] Appl. No.: 349,233

[22] Filed: Dec. 5, 1994

[30]     Foreign Application Priority Data

Dec. 9, 1993  [JP]  Japan ..................... 5-340763

[51] Int. Cl.⁶ .............. G11B 11/00; G11B 5/60
[52] U.S. Cl. .............. 369/13; 360/103; 360/114
[58] Field of Search .............. 369/13; 360/114, 360/103, 102, 122, 123, 125, 59, 128

[56]            References Cited

U.S. PATENT DOCUMENTS

| | | | |
|---|---|---|---|
| 4,164,770 | 8/1979 | Jeffers | 360/113 |
| 4,796,241 | 1/1989 | Hayakawa et al. | 369/13 |
| 5,231,554 | 7/1993 | Goto et al. | 360/103 |
| 5,239,425 | 8/1993 | Kazama | 369/13 |
| 5,260,921 | 11/1993 | Shibuya et al. | 369/13 |
| 5,305,294 | 4/1994 | Kime et al. | 369/13 |
| 5,402,397 | 3/1995 | Ohmori et al. | 369/13 |
| 5,444,678 | 8/1995 | Ogata | 369/13 |

FOREIGN PATENT DOCUMENTS 57-86122  5/1982  Japan ........................... 369/13

*Primary Examiner*—Tan Dinh
*Attorney, Agent, or Firm*—Guy W. Shoup; Patrick T. Bever

[57]            ABSTRACT

In a magnetic head apparatus that generates a strong magnetic field of magneto-optical recording or the like, a joint assembly of main and side cores is fitted into an accommodating groove formed in a ceramic slider, and a bobbin having a coil wound around it is fitted onto the main core. Further, a back core is fastened to the main and side coils. An electrical insulating layer extending along the dimension of the magnetic path is formed in the main core to divide conductive region by the sections of the main core. Thus, the eddy current generated along a dimension perpendicular to the magnetic path is suppressed, whereby the core loss is mitigated and the quantity of heat generated in the core is reduced.

6 Claims, 9 Drawing Sheets

E-TYPE MAGNETIC HEAD FOR MAGNETO-OPTICAL RECORDING DEVICE

BACKGROUND OF THE INVENTION

The present invention relates to a magnetic head apparatus for use in magneto-optical recording, high-density magnetic recording or the like whose core section generates a large quantity of heat, and, in particular, to a magnetic head apparatus which is capable of suppressing the heat generation in the core section.

DESCRIPTION OF THE RELATED ART

FIG. 13 is a diagram illustrating a conventional magnetic head for magneto-optical recording and the operation thereof.

In FIG. 13, a magnetic head 1 includes an I-shaped main core 3 formed of a ferromagnetic material like Mn—Zn ferrite, and C-shaped side cores 4 that are also formed of Mn—Zn ferrite or the like. The upper and lower sections of the side cores 4 are joined to the sides of the main core 3. The junction between the lower sections of the cores is effected through the intermediation of glass material 5 to form two magnetic gaps G. A coil 6 is wound around the main core 3.

The magnetic head 1 is mounted, for example, on a slider of the type which is levitated by air flow, and faces a magneto-optical type recording medium 7 through the intermediation of a minimum of gap. In magneto-optical recording, a laser beam 12 is condensed by a condensing lens 11 before it is applied to a perpendicular magnetization layer 9 through a translucent cover 8. The perpendicular magnetization layer 9 is heated by the light energy of the laser beam 12. At this time, a recording current is passed through the coil 6 of the magnetic head 1, and a magnetic field generated by this recording current is applied to the heated region of the recording medium 7 to magnetize the perpendicular magnetization layer 9.

In magneto-optical recording of this type, a strong current of several hundreds mA is applied to the coil 6, so that, due to the core loss attributable to eddy current loss, etc. in the core, a large power consumption and a large heat generation amount are involved. Further, since the sizes of the cores 3 and 4, embedded in a ceramic slider or the like, are small, the core surface area is rather small, resulting in a poor heat dissipation property. As a result, the temperature of the cores 3 and 4 tends to become high. In some cases, the temperature can range from several tens to approximately 100° C.

When the temperature of the cores 3 and 4 becomes high, it approaches the Curie point to cause a reduction in the magnetic field strength of the cores 3 and 4, whereby not only are the magnetic properties of the head deteriorated but a protective cover 10 of the recording medium 7 is adversely affected by the heat.

Further, in the conventional magnetic head 1 shown in FIG. 13, the C-shaped side cores 4 are joined to the I-shaped main core 3, so that it is not possible for the coil 6 to be mounted by using a bobbin. It is necessary to perform the operation of winding copper wire around the main core 3, with the result that the assembly work is very difficult to conduct.

SUMMARY OF THE INVENTION

The present invention has been made with a view toward solving the above problems. It is an object of the present invention to provide a magnetic head apparatus which effectively suppresses heat generation by reducing core loss or enables heat to be easily dissipated from the core and which is capable of realizing facility in assembly.

In one aspect of the present invention, there is provided a magnetic head apparatus of the type which includes main and side cores forming a gap, and a coil for generating a magnetic field in a closed magnetic path extending via the main and side cores, wherein the main core is divided by an electrical insulating layer formed along the dimension of the magnetic path.

In another aspect of the present invention, there is provided a magnetic head apparatus of the type which includes main and side cores forming a gap, a back core joined to the main and side cores, and a coil for generating a magnetic field in a closed magnetic path extending via the main, side and back cores, wherein at least either the main core and the side cores are joined to the back core through the intermediation of a non-magnetic layer or an electrical insulating layer.

In the above construction, it is possible for the back core to be glued to the main and side cores by means of an adhesive that constitutes the non-magnetic layer or the electrical insulating layer, with a bobbin which has a coil wound around it having been fitted onto the main core.

In still another aspect of the present invention, there is provided a magnetic head apparatus of the type which includes main and side cores forming a gap, and a coil for generating a magnetic field in a closed magnetic path extending via the main and side cores, wherein a heat dissipating member is provided which is directly joined to the main core.

In the above construction, when a bobbin having a coil wound around it is fitted onto the main core, a heat dissipating member formed of a sheet material can be fitted into a gap between the outer surface of the main core and the inner surface of the bobbin hole.

Further, the bobbin may be formed of a heat dissipating material so that the bobbin itself constitutes a heat dissipating member.

In the first aspect of the present invention described above, the main core is divided by an electrical insulating layer extending along the dimension of the magnetic path. Eddy current loss is one of the factors causing core loss in a magnetic head of this type. By dividing the main core by an electrical insulating layer, the eddy current can be insulated between the separating sections of the main core, thereby achieving a reduction in core loss. By reducing the core loss due to the eddy current, the power consumption can be cut down, and the heat generation in the core can be suppressed. Further, since the cross-sectional area of the magnetic path of the main core is not substantially reduced, there is practically no deterioration in the efficiency of the generated magnetic field.

In the second aspect of the present invention described above, at least either the main core and the side cores are joined to the back core through the intermediation of a non-magnetic layer, whereby a magnetic insulating section can be formed in the closed magnetic path. By appropriately adjusting this magnetic insulation, it is possible to change the flow of magnetic flux in the closed magnetic path. When an electrical insulating layer is used instead of the non-magnetic layer, the route of the eddy current can be changed so as to suppress the same. By thus providing a non-magnetic layer or an electrical insulating layer, the core loss can be reduced. When a layer which can serve as both a non-magnetic layer and an electrical insulating layer is provided, the core loss reducing effect is still more enhanced. When a magnetically insulating area is formed in the closed magnetic path, the strength of the generated magnetic field per number of turns of the coil is reduced. However, since the inductance of the magnetic circuit is also reduced, the effective recording efficiency, that is, the ratio between inductance and magnetization efficiency, is not reduced. Thus, by increasing the number of turns of the coil, the same level of recording efficiency as in the prior art can be obtained. Further, by reducing the core loss, it is possible to suppress the quantity of heat generated in the core, etc.

Further, in the above construction, the back core can be separated from the main and side cores, and glued by means of an adhesive constituting a non-magnetic and electrical insulating layer, so that the back core can be glued and secured in position after a bobbin around which the coil is wound has been fitted onto the main core. Since a bobbin can be used, the operation of assembling the magnetic head is facilitated.

Further, in the above-described construction, a heat dissipating member directly joined to the main core is provided. The heat generated in the main core is dissipated into the atmosphere through the heat dissipating member that is directly joined thereto, so that even in a construction in which the core is embedded in a ceramic slider or the like, the heat generation in the core can be effectively suppressed.

When the heat generating member is formed of a sheet material, and fitted into the gap between the outer surface of the main core and the inner surface of the bobbin hole, the heat generating member can be reliably brought into contact with the main core solely by an inserting operation. Further, when the bobbin is formed as a heat dissipating member that is made of a heat dissipating material, such as an aluminum alloy, aluminum nitride (Al—N), or SiC, there is no need to provide a separate heat dissipating member.

DESCRIPTION OF THE PREFERRED EMBODIMENTS

Embodiments of the present invention will now be described.

Figure 1:
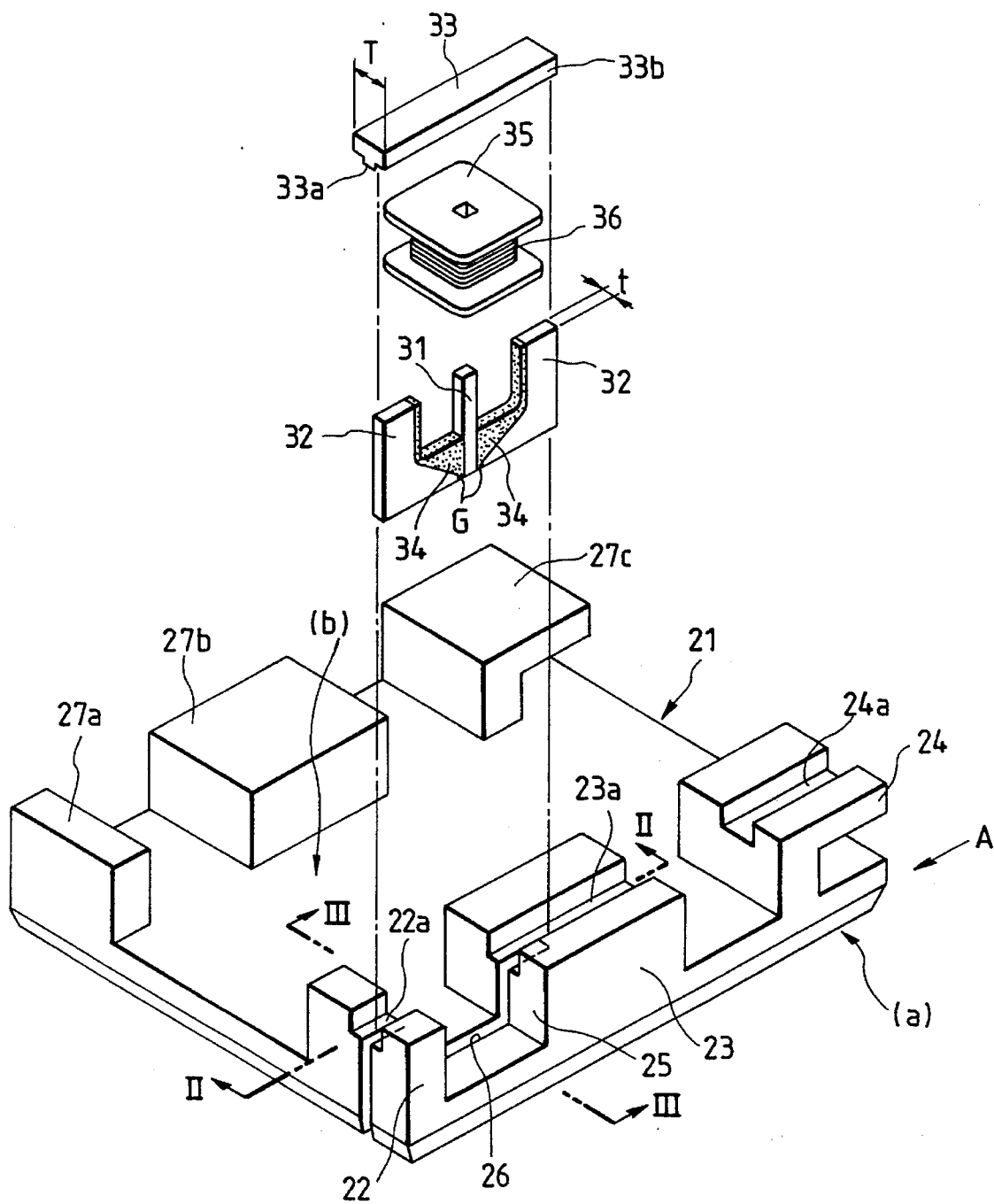
FIG. 1 is an exploded perspective view of a magnetic head apparatus for used in a magneto-optical recording apparatus, constituting an example of the magnetic head apparatus of the present invention.

FIG. 1 is an exploded perspective view of a magnetic head apparatus for magneto-optical recording.

Numeral 21 indicates a slider. The slider 21 is formed of a ceramic material, such as $CaTiO_3$ (calcium titanate). In the drawing, the bottom side of the slider, indicated by symbol (a), constitutes the surface opposed to the recording medium, and the upper side of the slider, indicated by symbol (b), constitutes the support surface for supporting by gimbal suspension. In a magneto-optical recording apparatus, the recording medium runs in the direction indicated by the arrow A. An air flow between the recording medium and the surface on the side (a) causes the slider 21 to levitate above the recording medium, with a minute gap therebetween.

First, second and third protrusions 22, 23 and 24 are formed on the side (b) of the slider 21, and grooves 22a, 23a and 24a having the same width and the same depth are respectively formed in the top sections of these protrusions. A recess 25 is defined between the first and second protrusions 22 and 23. A narrow core accommodating groove 26 communicating with the side (a) is formed along the grooves 22a and 23a and the bottom of the recess 25.

Further, protrusions 27a, 27b and 27c having substantially the same dimensions as the protrusions 22, 23 and 24 are provided at the other end of the side (b) of the slider 21.

Numeral 31 indicates an I-shaped main core formed of Mn—Zn ferrite or the like, and numeral 32 indicates side cores that are also formed of Mn—Zn ferrite and respectively joined to each side of the main core. Glass material portions 34 are provided in the junctions between the main and side cores 31 and 32, which junctions are in the lower sections of the cores. The glass material portions 34 constitute two magnetic gaps G. The main and side cores 31 and 32, which have the same width t, are fitted into the core accommodating groove 26 in such a way as to leave no clearance therebetween, and secured to the slider 21 by means of a low-melting-point glass, adhesive or the like.

A back core 33 is joined to the rear ends of the main and side cores 31 and 32. The back core 33 is formed of Mn—Zn ferrite or the like. A lower surface 33a of the back core 33 is joined to the upper surfaces of the main and side cores 31 and 32. An upper section 33b of the back core 33, whose width is substantially the same as the width of the grooves 22a and 23a in the top sections of the protrusions 22 and 23, are fitted into the grooves 22a and 23a in such a way as to leave no clearance and secured therein by means of adhesive or the like.

A bobbin 35 can be fitted onto the main core 31. A coil 36 is wound around this bobbin 35. In this embodiment, the back core 33 is formed as a separate component, so that the back core 33 can be mounted after the bobbin 35 has been fitted onto the main core 31, thereby greatly facilitating the assembly operation.

A laser beam condensed by a condensing lens is applied from the other side of the recording medium facing the slider 21, with the result that a perpendicular magnetization layer in the recording medium is heated by light energy. At this time, a closed magnetic path is formed in the main, side and back cores 31, 32 and 33 by a modulation current supplied from the coil, and a vertical magnetic field is imparted to the perpendicular magnetization layer from the magnetic gap sections G, thereby magnetizing the perpendicular magnetization layer in accordance with the modulation of the recording signal.

Regarding this magnetic head apparatus, basically constructed as described above, specific structures that are capable of mitigating core loss, suppressing the heat generation in the core, and cutting down the power consumption will be first described with reference to embodiments.

(First Embodiment)

Figure 2:
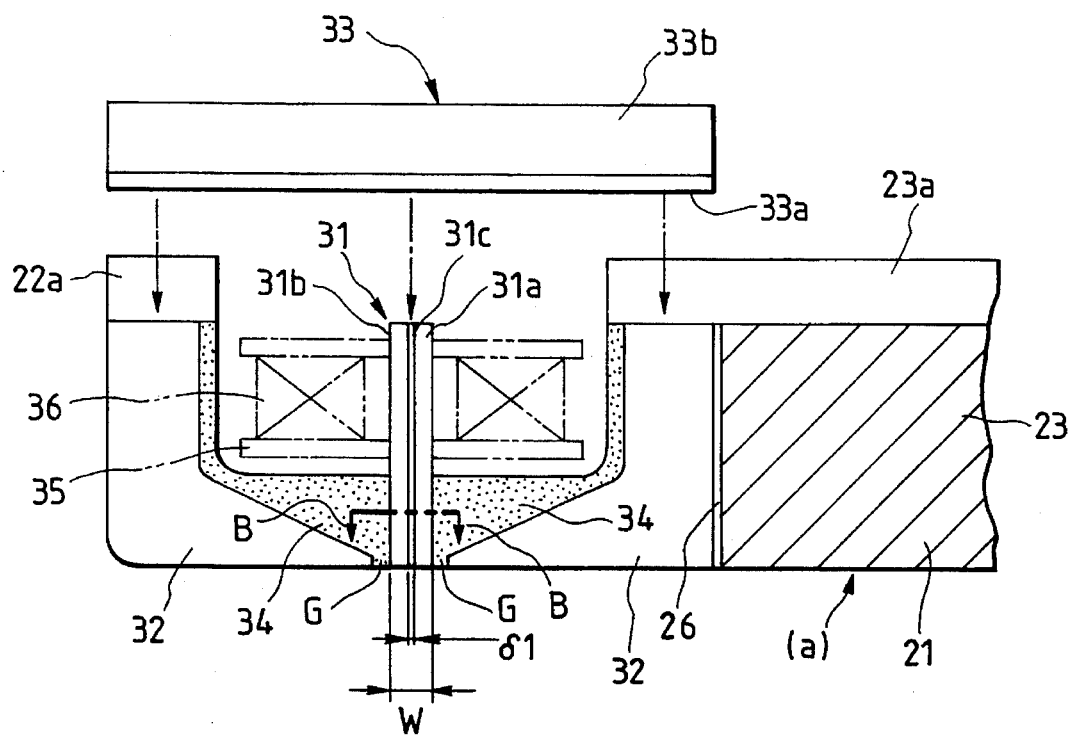
FIG. 2 is a sectional view corresponding to the line II—II of FIG. 1, showing a core structure according to a first embodiment of the present invention.
Figure 3A:
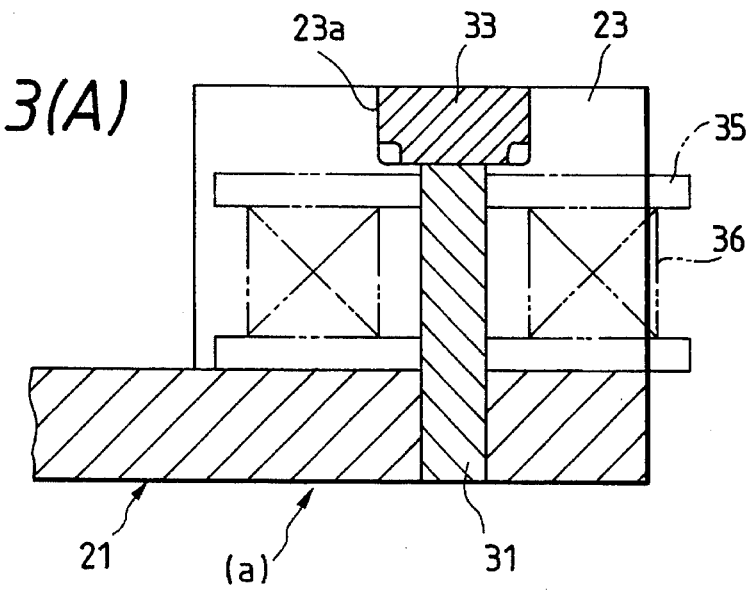
FIG. 3(A) is a sectional view corresponding to the line III—III of FIG. 1, showing the core structure according to the first embodiment.
Figure 3B:
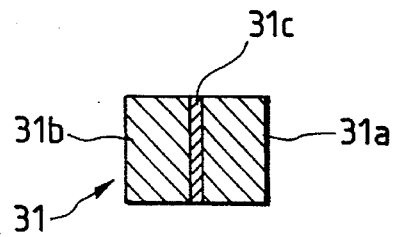
FIG. 3(B) is sectional view taken along the line B—B of FIG. 2.

FIGS. 2 and 3 show the first embodiment. FIG. 2 corresponds to the sectional view taken along the line II—II of FIG. 1, and FIG. 3(A) corresponds to the sectional view taken along the line III—III of FIG. 1. FIG. 3(B), which shows a plan sectional view of the main core 31, is a sectional view taken along the line B—B of FIG. 2.

In accordance with this embodiment, the eddy current loss in the main core 31, which is an important factor of core loss, is reduced, thereby suppressing core loss to maintain a high level of recording efficiency.

In the first embodiment, an electrical insulating layer 31c extending along the dimension of the magnetic path (the dimension of the vertical magnetic field), i.e., along the vertical dimension as seen in the drawing, is provided in the I-shaped main core 31, thereby dividing the main core 31 into divisional cores 31a and 31b. As shown in the sectional view of the main core 31 of FIG. 3(B), the divisional cores 31a and 31b respectively provided on the right and left sides are insulated by the electrical insulating layer 31c. The electrical insulating layer 31c is formed of an organic or inorganic electrically insulating material, such as glass or epoxy resin.

In this embodiment, the interior of the main core 31 is divided by the electrical insulating layer 31 to divide the section as the conductive region, whereby the eddy current generated along a dimension perpendicular to the magnetic flux is suppressed, thereby reducing the core loss. Further, as shown in FIG. 3(B), there is no substantial reduction in the sectional area of the magnetic path of the main core 31, so that there is no reduction in magnetic field inside the main core 31. Thus, it is possible to impart a magnetic field having a uniform distribution as in the prior art from the magnetic gap sections G to the perpendicular magnetization layer of the recording medium. Further, since there is no reduction in the sectional area of the magnetic path of the main core 31, it is possible to maintain a recording efficiency that is equivalent to that in the prior art.

It is necessary for the width dimension $\delta_1$ of the electrical insulating layer 31c shown in FIG. 2 to be at least 1.0 μm and more preferably, 0.3 μm or more, in order that the divisional cores 31a and 31b may be electrically insulated. An excessively large maximum value of the width dimension $\delta_1$ results in a reduction in the sectional area of the magnetic path of the divisional cores 31a and 31b, thereby affecting the magnetic field distribution imparted to the perpendicular magnetization layer and the recording efficiency. Thus, it is desirable for the width dimension $\delta_1$ to be not larger than 1/10 of the width dimension W of the main core 31. When the width dimension W of the main core 31 is 0.15 mm, a preferable maximum value of the width dimension $\delta_1$ of the electrical insulating layer 31c is 15 μm.

Figure 4:
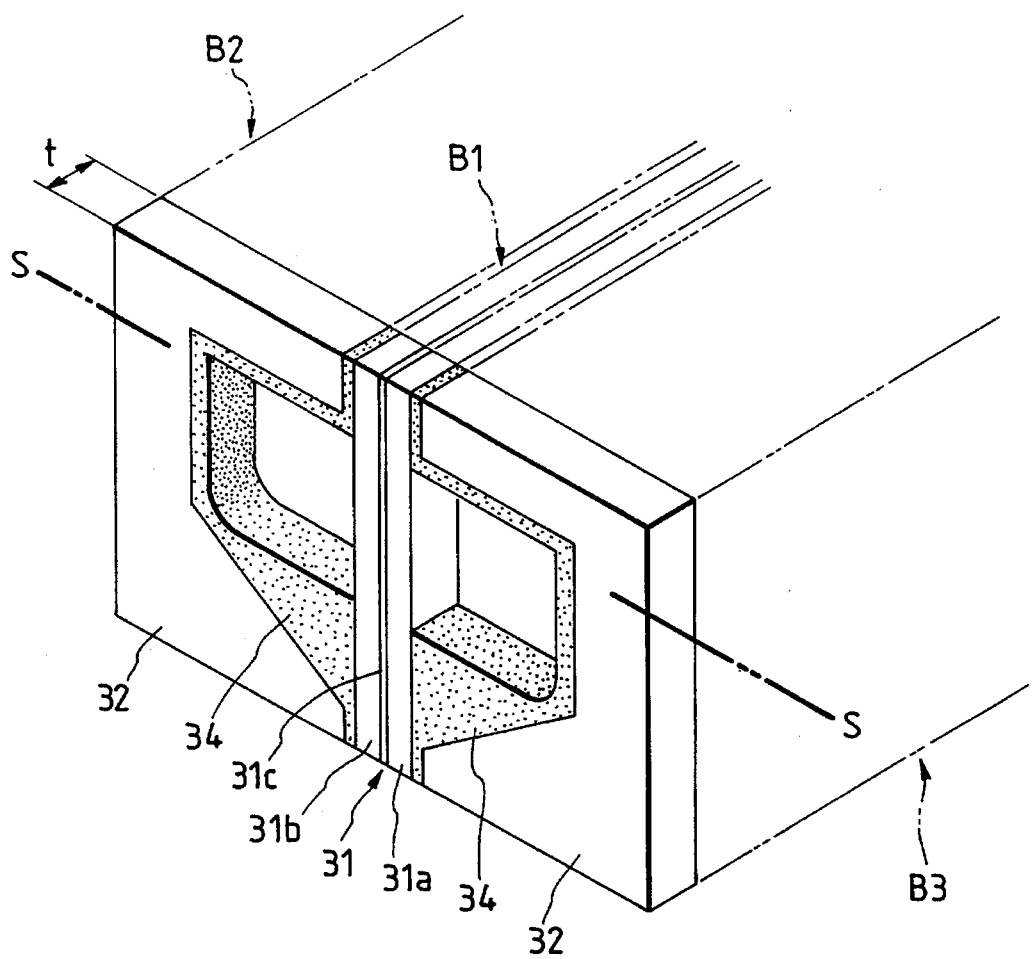
FIG. 4 is a perspective view illustrating an example of a manufacturing process for the core shown in FIG. 2.

FIG. 4 shows an example of a method of manufacturing a joint assembly of the main and side cores 31 and 32 shown in FIG. 2.

A magnetic substance block B1, which is the material of the main core 31, is prepared by joining sheets constituting the material of the divisional cores 31a and 31b to each other through the intermediation of the electrical insulating layer 31c. Magnetic substance blocks B2 and B3 having a C-shaped cross-sectional configuration are respectively joined to each side of the magnetic substance block B1 by means of a glass material 34. The blocks thus joined together are cut to the width dimension t to thereby obtain joint assemblies each consisting of main and side cores 31 and 32. FIG. 4 shows one of the joint assemblies thus obtained by cutting to the width dimension t. This assembly is used as it is as a magnetic core, which can be fitted into the core accommodating groove 26 of the slider 21 after winding a coil around the main core 31. When, as shown in FIG. 1, a separate back core 33 is used, the uppermost sections of the main and side cores 31 and 32 are cut along the cutting line S—S such that the resulting top surfaces are flush with each other after the cutting of the blocks to the width dimension t.

Figure 8:
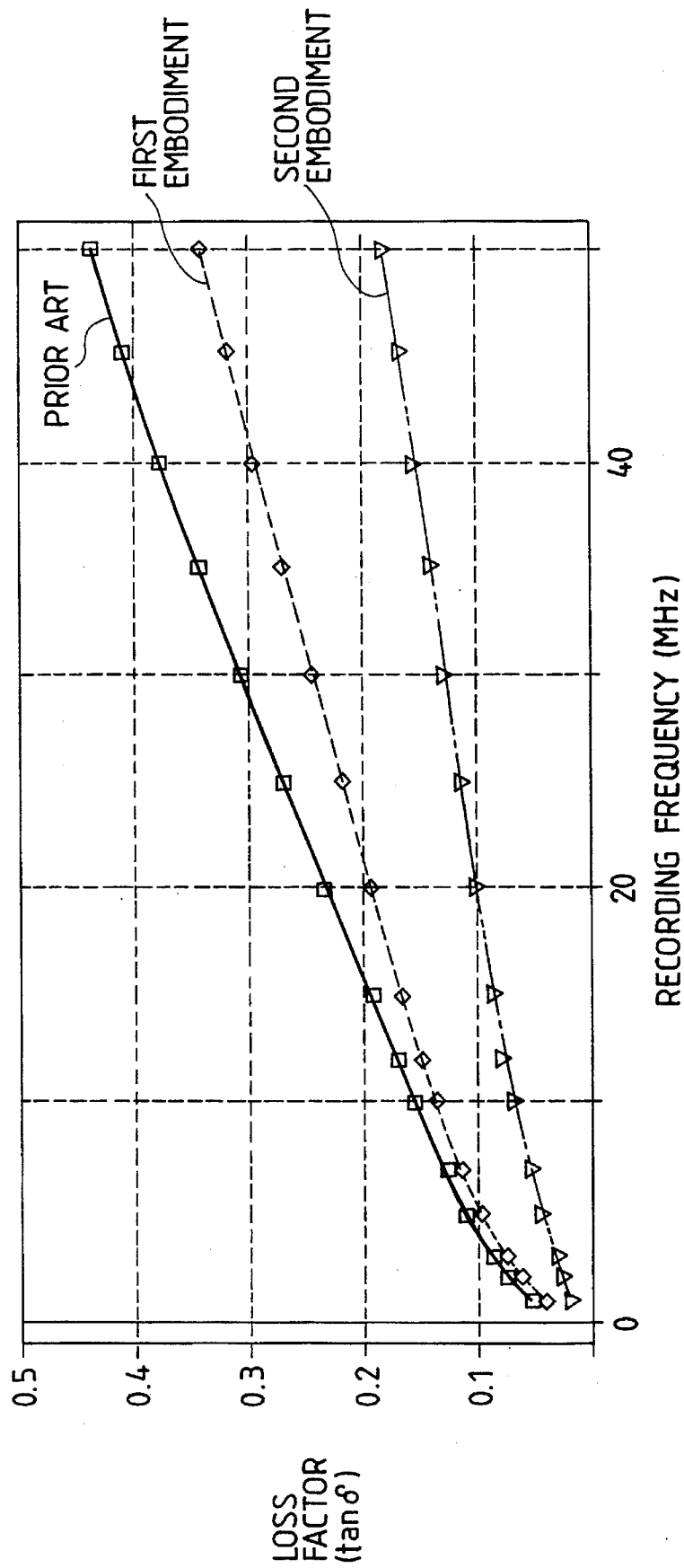
FIG. 8 is a chart in which the loss factors in the first and second embodiments and in a prior-art example are compared with each other.

Next, FIG. 8 is a chart in which the core loss characteristics of a magnetic head according to the first embodiment, a magnetic head according to the second embodiment described below, and a prior-art example, are compared with each other.

In FIG. 8, the horizontal axis indicates the frequencies (MHz) of currents imparted to the coils as recording signals, and the vertical axis indicates loss factor (tan δ). tan $\delta = \Delta R / \omega L$ (where $\Delta R$ is an increment as from a DC resistance; ω is an angular frequency at the frequency of the current used; and L is the inductance of the magnetic circuit).

In FIG. 8, the curve indicated by ◊—◊ shows the core loss characteristics of the core structure of the first embodiment, and the curve indicated by □—□ shows the core loss characteristics of the prior-art example.

The first embodiment as shown in the chart of FIG. 8 is a magnetic core obtained by cutting the above-described blocks to the width dimension t, but, in this example, the top sections thereof have not been cut yet along the cutting line S—S. The main and side cores 31 and 32 in this embodiment are formed of Mn—Zn ferrite. The main core 31 has a square sectional configuration of 0.15×0.15 mm. The electrical insulating layer 31c is formed of $SiO_2$ and has a thickness dimension of 0.5 μm. The prior-art example as shown in FIG. 8 is the same as the first embodiment insofar that the main and side cores 31 and 32 are formed of Mn—Zn ferrite and that the main core 31 has a square sectional configuration of 0.15×0.15 mm. However, the prior-art example has no electrical insulation layer 31c, so that the section of the main core 31 is not electrically separated.

It can be seen from the chart of FIG. 8 that use of the magnetic core according to the first embodiment leads to a reduction in loss coefficient at different frequencies as compared with the prior-art example. That is, it can be seen that, in the first embodiment, owing to the provision of the electrical insulating layer 31c in the main core 31, the eddy current loss in the main core 31 is reduced to thereby reduce the core loss. Thus, in accordance with the first embodiment, the heat generation due to core loss can be suppressed to a larger degree than in the prior-art example, and, further, a reduction in power consumption can also be achieved. Further, it can also be seen from FIG. 8 that, the higher the frequency of the current imparted to the coil, the smaller the loss factor. Thus, it will be understood that the heat generation suppressing effect, etc. can be enhanced as the recording density increases.

(Second Embodiment)

Figure 5:
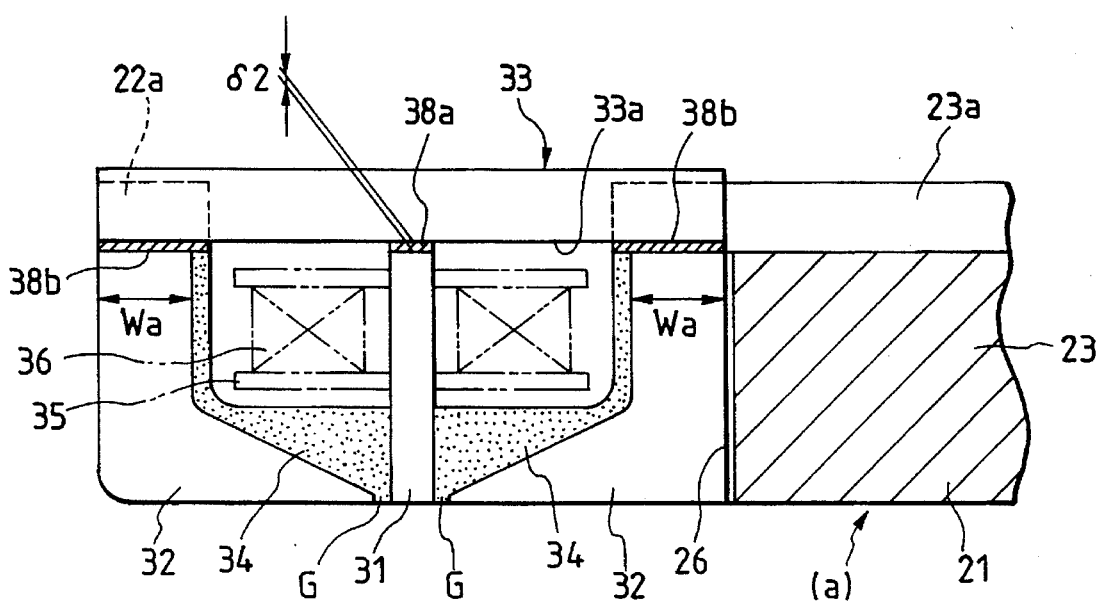
FIG. 5 is a sectional view corresponding to the line II—II of FIG. 1, showing a core structure according to a second embodiment of the present invention.

FIG. 5 shows the second embodiment of the present invention, and corresponds to the sectional view taken along the line II—II of FIG. 1.

In the second embodiment, a magnetically and electrically insulating region is provided in the closed magnetic path extending via the main, side and back cores 31, 32 and 33, thereby achieving a reduction in core loss.

In the second embodiment shown in FIG. 5, no electrical insulating layer 31c as in the first embodiment is provided in the main core 31, so that the cross-section of the magnetic path of the main core 31 is square. Non-magnetic and electrically insulating layers 38a and 38b are provided between the upper surfaces of the main and side cores 31 and 32 and the joint surface of the back core 33. These non-magnetic and electrically insulating layers are formed of a glass material, a non-magnetic and non-conductive metal film, a resin or the like. When an organic resin adhesive is used as the material of these non-magnetic and electrically insulating layers 38a and 38b, and the back core 33 is joined to the main core 31 and the side cores 32 after the bobbin 35 has been fitted onto the main core 31, the coil mounting operation can be performed more easily as compared with the conventional operation of winding the coil around the main core.

Figure 6:
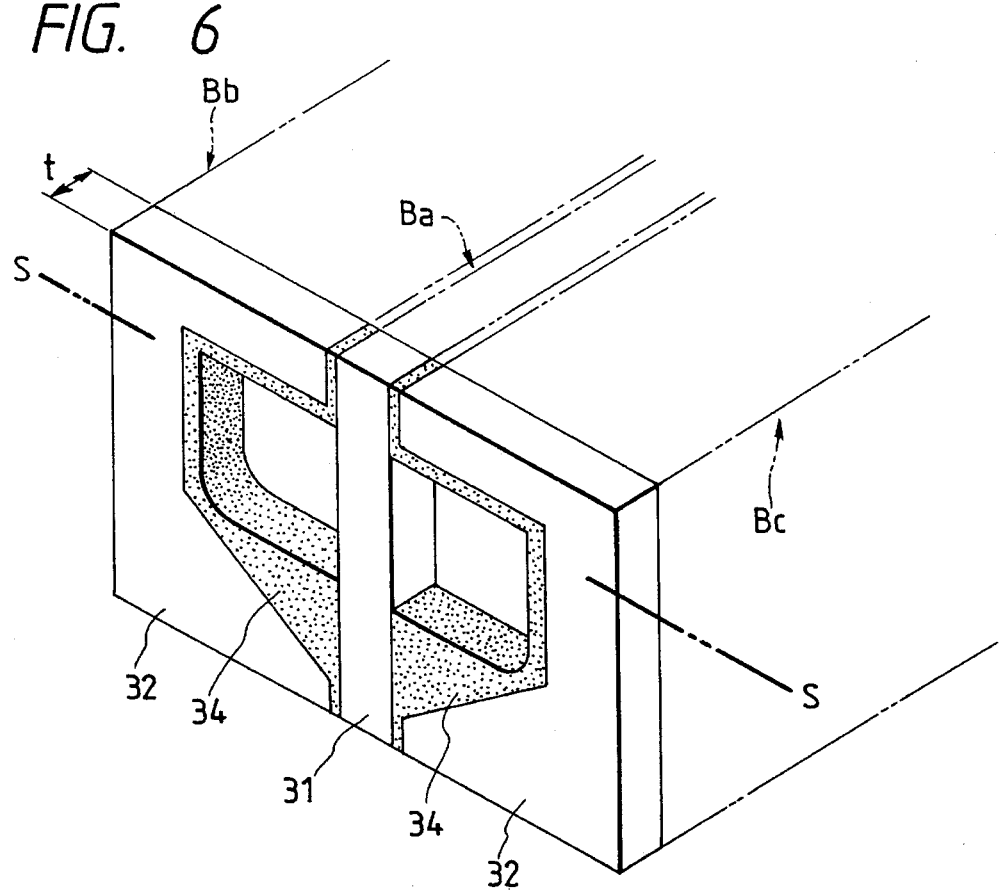
FIG. 6 is a perspective view illustrating a manufacturing process for the core shown in FIG. 5.

FIG. 6 shows an example of a manufacturing process for a magnetic core according to the second embodiment. Magnetic substance blocks Bb and Bc of Mn—Zn ferrite constituting the material for the side blocks 32 and having a C-shaped sectional configuration are respectively joined to each side of a magnetic substance block Ba of Mn—Zn ferrite constituting the material for the main block 31 by means of a glass material 34. The block assembly thus obtained is cut to a width dimension of t, and further, cut along the cutting line S—S, whereby the upper end sections of the main and side cores 31 and 32 are removed. This cutting along the cutting line S—S is effected in such a way that the resulting top surfaces of the main and side cores 31 and 32 are flush with each other. The back core 33 is separately prepared by using Mn—Zn ferrite material.

In the second embodiment shown in FIG. 5, an appropriate magnetic and electrical insulation is effected in the closed magnetic path extending via the main, side, and back cores 31, 32 and 33 due to the provision of the non-magnetic and electrically insulating layers 38a and 38b. Due to this appropriate magnetic insulation, the route of the magnetic flux is different from that in the prior art, and, due to the electrical insulation, the route of the eddy current in the core is changed. Further, due to the arrangement, in which, as shown in FIG. 6, the upper end portions of the main and side cores 31 and 32 are cut off along the cutting line S—S to open the upper ends of the cores 31 and 32, any distortion in the core is removed. Due to these factors, a reduction in core loss can be achieved.

When the thickness dimension $\delta 2$ of the non-magnetic and electrically insulating layers 38a and 38b is too small, the magnetic insulation effect is deteriorated, resulting in a deterioration in the core loss reducing effect. On the other hand, when the thickness dimension is too large, the magnetic insulation is excessively strong, so that the generated magnetic field is reduced, resulting in a deterioration in magnetic field efficiency. In view of this, a preferable thickness dimension $\delta 2$ is set at a dimension not less than 0.1 μm but not more than 25 μm.

In FIG. 8, the curve indicated by ∇—∇ shows the variation in the cores loss when the core structure of the second embodiment is used.

In the second embodiment, whose characteristics are shown in FIG. 8, the main, side and back cores 31, 32 and 33 are formed of Mn—Zn ferrite, and the core structure has a configuration as shown in FIG. 5. As in the prior-art example and the first embodiment, the sectional configuration of the main core 31 is a square of 0.15×0.15 mm. The width dimension Wa of the upper end sections of the side cores 32 is 0.35 mm, and the sectional configuration of those sections of the side cores 32 which are joined to the back core 33 is a rectangle of 0.15×0.35 mm. The non-magnetic and electrically insulating layers 38a and 38b are formed of epoxy resin and have a thickness $\delta 2$ of 10 μm.

It can be seen from FIG. 8 that the core structure of the second embodiment makes it possible to attain a still further reduction in loss factor as compared with the prior-art example and the first embodiment. The loss factor reduction effect becomes more conspicuous as the frequency of the current supplied to the coil becomes higher.

However, in the second embodiment, a magnetically insulating section is formed in the closed magnetic path, so that the strength of the generated magnetic field in the closed magnetic path with respect to the predetermined number of turns of the coil is reduced. However, since the inductance of the magnetic circuit is reduced at the same time, the ratio of the magnetization efficiency to the inductance is the same as in the prior art. Thus, by making the number of turns of the coil larger than that in the prior art, it is possible to obtain the magnetic strength and magnetic field distribution needed for perpendicular magnetization. In addition, it is possible to reduce the core loss as compared with the prior art while obtaining the same magnetic field strength, thereby making it possible to effectively suppress the core heat generation. In this regard, a measurement was performed on actual cores. The measurement results are shown in FIGS. 9 and 10.

The cores used in the measurement have the same configuration as that shown in FIG. 5. The main core 31 has a square sectional configuration of 0.15×0.15 mm, and those sections of the side cores 32 which are joined to the back core 33 have a rectangular sectional configuration of 0.15×0.35 mm. An epoxy-type adhesive resin was used as the material of the non-magnetic and electrically insulating layers 38a and 38b. There is a variation in the application amount of this adhesive resin. A measurement of this variation showed that the thickness dimension $\delta 2$ of the non-magnetic and electrically insulating layers ranged from 4 μm to 20 μm.

Figure 9:
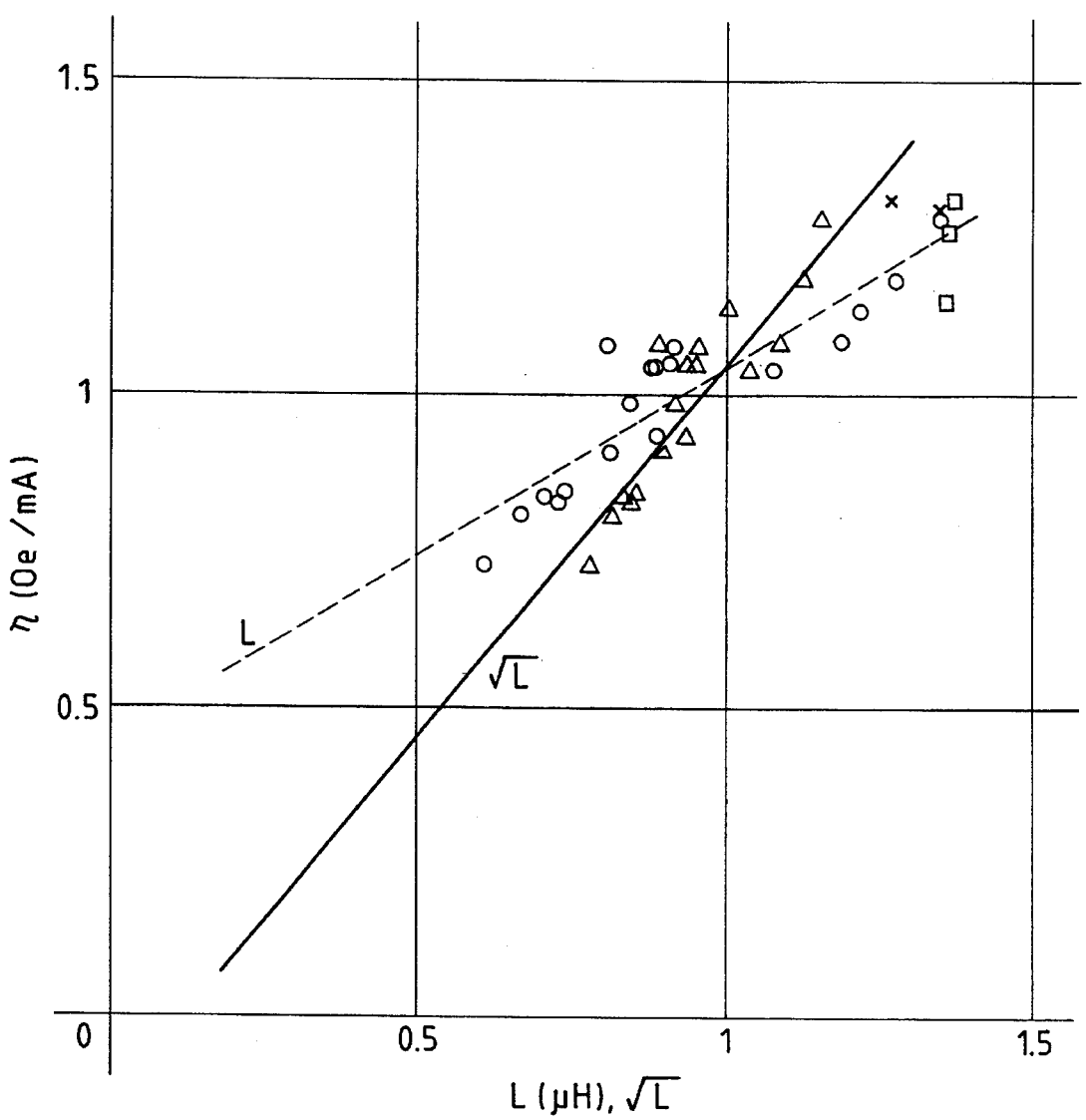
FIG. 9 is a chart showing the relationship between the inductance, square root thereof, and magnetization efficiency in the second embodiment.
Figure 10:
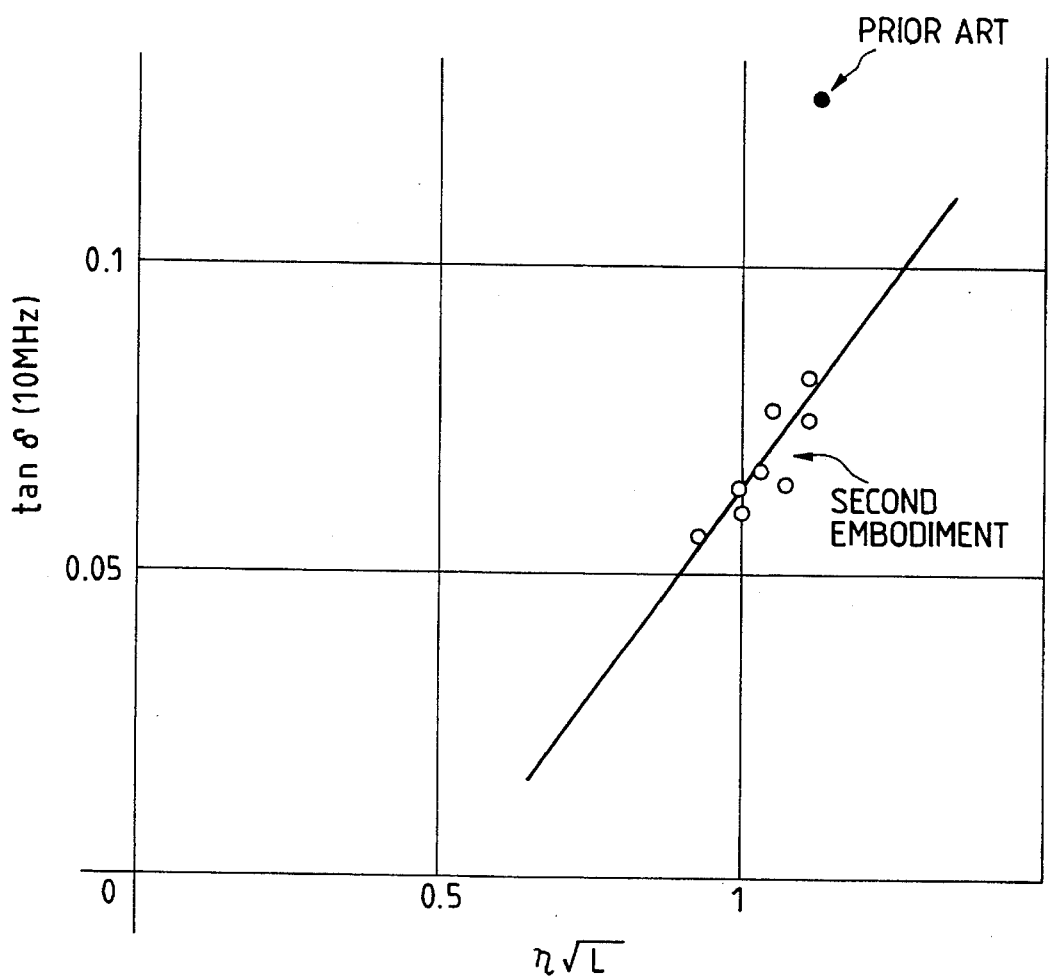
FIG. 10 is a chart showing the relationship between the (magnetization-efficiency/inductance-square-root) and the loss factor in the second embodiment.

In FIG. 9, the vertical axis indicates magnetization efficiency η (Oe/mA), that is, the strength of a generated magnetic field with respect to a current of 1 mA. The horizontal axis indicates inductance L and the square root of L. In FIG. 9, the symbol ○ indicates the relationship between the inductance L and magnetization efficiency η of an actual magnetic core, and the broken line L indicates a distribution line thereof. The variation in the symbol ○ is due to the variation in the thickness dimension $\delta 2$ of the above-described non-magnetic and electrically insulating layer. The symbol △ indicates the relationship, obtained by calculation, between the square root of inductance L and magnetization efficiency. The solid line indicates a distribution line thereof. The symbols □ and × indicate the relationship between inductance L and magnetization efficiency η in the conventional magnetic core shown in FIG. 6, obtained by cutting to the width dimension t but not cut along the cutting line S—S yet.

In FIG. 9, the distribution line (solid line) indicated by the symbol Δ is a linear line having an inclination of approximately 45°. It can be seen from this distribution line that the square root of inductance L and the magnetization efficiency η increase and decrease in the same proportion. That is, the ratio (magnetization-efficiency-η/square-root-of-inductance-L) is kept substantially constant. The inductance L is in proportion to the square of the number of turns of the coil, and the square root of the inductance L is in proportion to the number of turns of the coil, so that, when, in the second embodiment, the number of turns of the coil is increased, it is possible to enhance the magnetization efficiency η to a level equivalent to that in the prior art, in proportion to this increase.

In FIG. 10, the horizontal axis indicates (magnetization-efficiency-η/square-root-of-inductance-L), and the vertical axis indicates the core loss (tan δ) when the frequency of the current is 10 MHz. In FIG. 10, the circles o indicate the second embodiment, and the circle filled in with black indicates a prior-art example.

According to FIG. 10, in the second embodiment, the values of magnetization efficiency η with respect to the square root of inductance L is distributed substantially around "1", which is hardly different from the prior art indicated by the circle filled in with black. Further, it can be seen that, of the second embodiment and the prior art example, in which the magnetization-efficiency-η/square-root-of-inductance-L) is substantially the same, the second embodiment exhibits a substantial reduction in core loss as compared with the prior art example.

As described above, in the second embodiment, it is possible to obtain the same level of magnetic field strength as that in the prior art by increasing the number of turns of the coil. Further, since the core loss with respect to magnetization-efficiency-η/square-root-of-inductance-L) in the second embodiment is substantially lower than in the prior art, it is possible, in the second embodiment, to mitigate the core loss and reduce the core heat generation even when a magnetic field of the same magnetic field strength as that in the prior art is generated.

Figure 7:
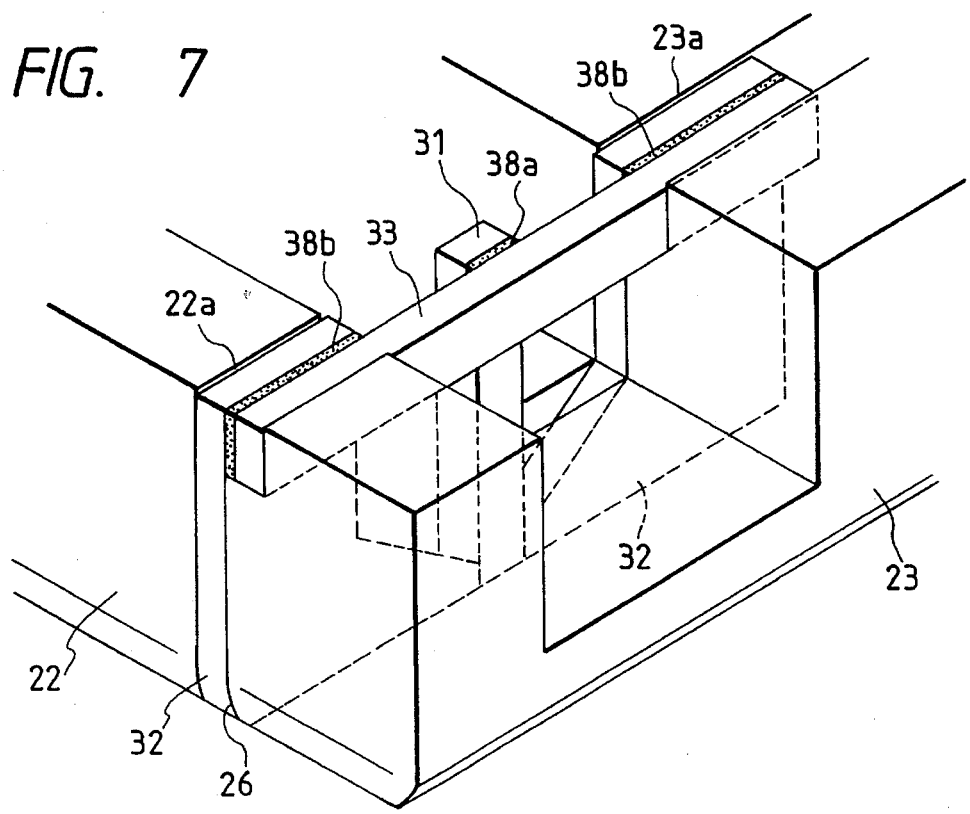
FIG. 7 is a perspective view illustrating a modification of the core according to the second embodiment.

FIG. 7 shows a modification of the core structure of the second embodiment. In this modification, the back core 33 is joined to side surfaces of the upper end sections of the main and side cores 31 and 32 through the intermediation of the non-magnetic and electrically insulating layers 38a and 38b. This modification also provides the effect of magnetically and electrically insulating the magnetic path, providing an effect equivalent to that of the structure shown in FIG. 5. When, in FIG. 7, the non-magnetic and electrically insulating layers are formed of a material having no adhesiveness, the main, side and back cores 31, 32 and 33 may be brought into press contact with each other by plate springs or the like, with the non-magnetic and electrically insulating layers being placed therebetween.

It is also possible for the non-magnetic and electrically insulating layer to be provided only in the junction between the main and back cores 31 and 33, or only in the junctions between the side and back cores 32 and 33.

While in the second embodiment the magnetic and electrical insulation is effected by the layers 38a and 38b, a reduction in core loss can also be effected when only the magnetic insulation is effected by non-magnetic layers instead of the layers 38a and 38b. Similarly, it is possible to obtain a positive effect in terms of eddy current change by effecting only the electrical insulation.

(Third Embodiment)

Figure 11:
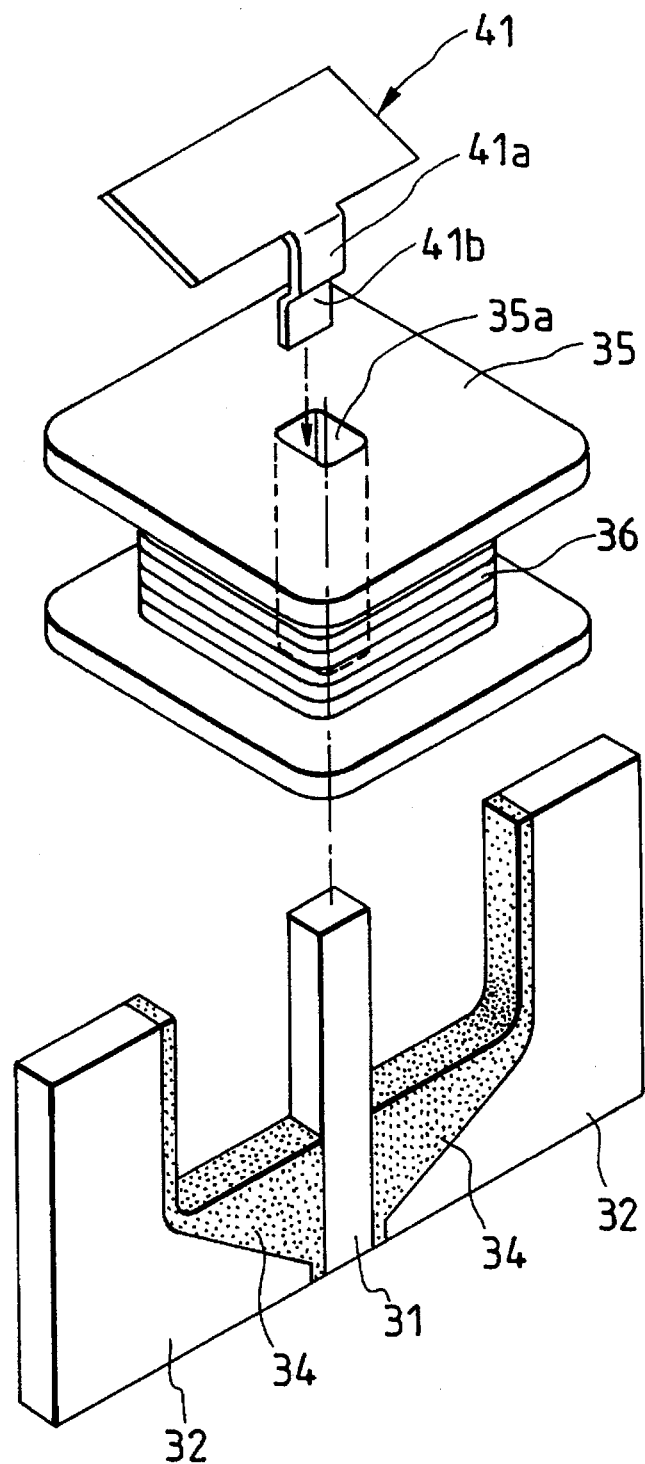
FIG. 11 is an exploded perspective view showing a third embodiment.
Figure 12:
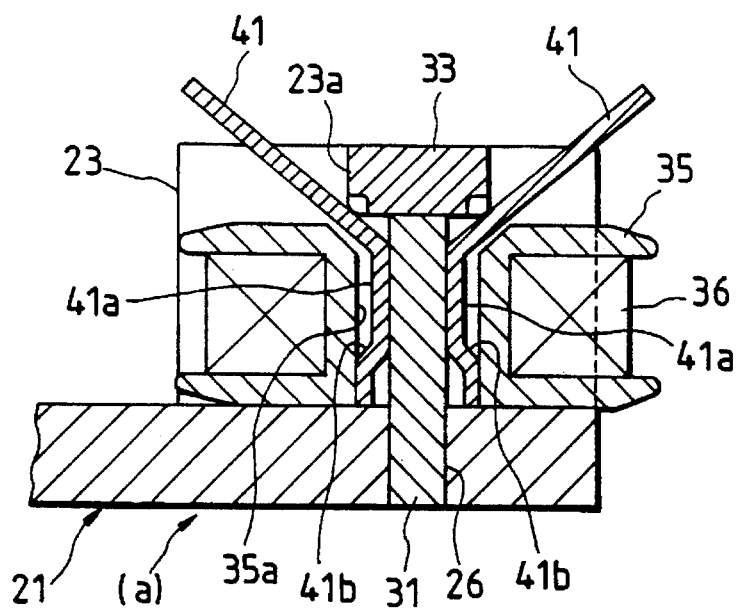
FIG. 12 is sectional view showing the third embodiment.
Figure 13:
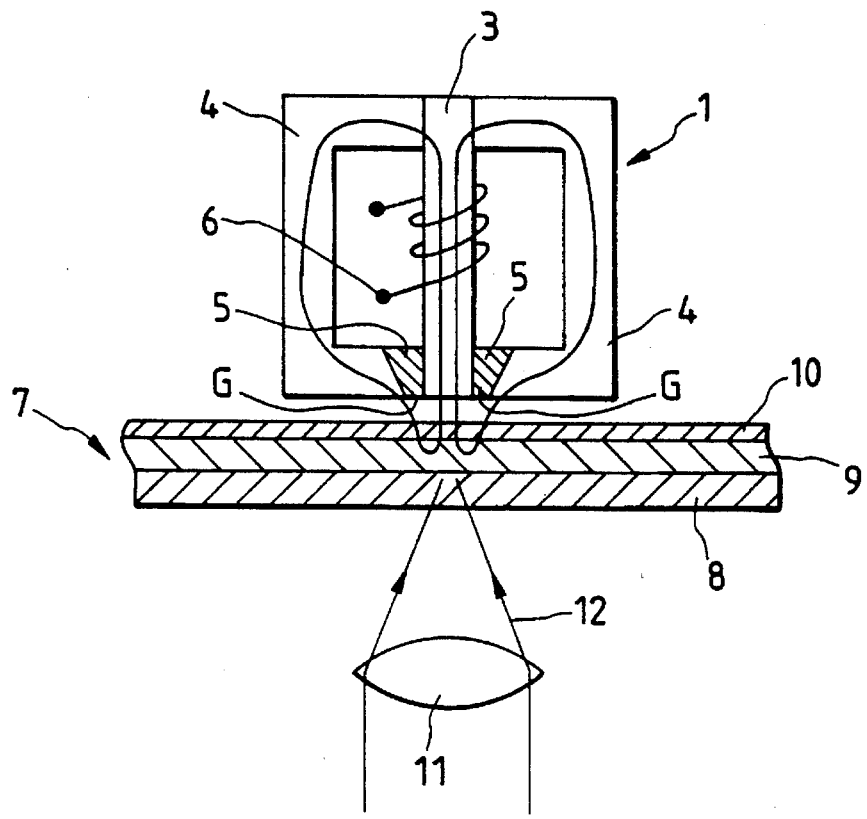
FIG. 13 is a diagram illustrating the magneto-optical recording system.

FIGS. 11 and 12 show the third embodiment of the present invention.

While in the first and second embodiments the core heat generation is suppressed by mitigating the core loss, in this embodiment, an increase in core temperature is prevented by dissipating the core heat into the atmospheric air.

FIG. 12 is a sectional view corresponding to the line III—III of FIG. 1, and FIG. 11 is an exploded perspective view. As shown in FIG. 12, in this embodiment, two heat dissipating plates 41 are provided, of which only one heat dissipating plate 41 is shown in FIG. 11.

The heat dissipating plates 41 are formed of a plate spring material having a high heat conductivity, for example, berylium copper plates. The heat dissipating plates 41 have legs 41a including bent sections 41b. When the bobbin 35 having the coil 36 wound around it is fitted onto the main core 31, the legs 41a of the heat dissipating plates 41 are inserted into the gap between the inner surface of an attachment hole 35a of the bobbin 35 and the outer surface of the main core 31. Due to the bent sections 41b of the legs 41a, the legs 41a can be elastically fitted into the gap between the main core 31 and the attachment hole 35a, thereby enabling the legs 41a to be reliably brought into close contact with the outer surface of the main core 31.

After the bobbin 35 have been fitted onto the main core 31, and the heat dissipating plates 41 have been fitted into the above-mentioned gap, the back core 33 is mounted as shown in FIG. 12.

In this embodiment, the heat dissipating plates 41 are directly joined to the main core 31, which is liable to generate heat due to loss, whereby it is possible to effectively dissipate the heat generated in the core into the atmospheric air. In particular, in a composite type magnetic head apparatus, in which, as shown in FIG. 1, the core is fitted into the accommodating groove 26 of the ceramic slider 21, the cores 31 and 32 are exposed to the air with a small area, so that it is difficult for the core heat to be directly dissipated into the air. However, when the heat dissipating plates 41, which are in direct contact with the main core 31, are arranged such that the plates extend into the air, the core heat can be effectively dissipated.

When the legs 41a of the heat dissipating plates 41 are fitted into the gap between the main core 31 and the attachment hole 35a, the gap where this fitting is effected may be filled with a material having a high heat conductivity, for example, silicon rubber. This enables the heat dissipating plates 41 to be reliably fastened. At the same time, due to the silicon rubber, the core heat can be effectively transmitted to the heat dissipating plates 41.

Further, it is also possible to provide only one heat dissipating plate 41. When there is no space available for allowing the plates to extend upwards as shown in FIG. 12, the heat dissipating section of the heat dissipating plate 41 may be placed on the upper surface of the bobbin 35 and adhered thereto. Further, the heat dissipating members are not restricted to plates. They may also be in the form of wires.

(Fourth Embodiment)

In the fourth embodiment, the bobbin 35 itself is used as the heat dissipating member. In this embodiment, no heat dissipating plates are provided. Instead, the bobbin 35 is formed of a metal, such as aluminum alloy, or a ceramic material having a high heat conductivity, such as Al—N or SiC. When the bobbin 35 is fitted onto the main core 31, the gap therebetween is filled with a material having a high heat conductivity, such as silicon rubber. In this embodiment, the core heat is dissipated into the air from the bobbin 35.

In the above description, structures capable of suppressing core heat generation or promoting heat dissipation have been shown as the first through fourth embodiments. These embodiments may be realized separately or in combination.

Further, while in the above embodiments two side cores 32 are respectively joined to the right and left sides of the main core 31, it is also possible for a single side core 32 to be joined to the main core 31.

Further, while the magnetic head of this invention is mainly intended to be used in optical recording using an optical memory apparatus, a mini-disc apparatus or the like, the present invention is applicable to magnetic heads in general whose cores generate large quantities of heat, i.e., magnetic heads capable of performing high density recording. Further, the type of magnetic head is not limited to the levitating type.

In the first aspect of the present invention, the main core is separated by an electrical insulating layer, and the eddy current is insulated between the separation sections of the main core, thereby attaining a reduction in core loss. Since the core loss due to the eddy current loss can be mitigated, the power consumption can be cut down, and the heat generation in the core can be suppressed. Further, since there is substantially no reduction in the magnetic-path sectional area of the main core, the efficiency of the generated magnetic field is substantially not reduced.

In the second aspect of the present invention, a magnetically or electrically insulating section is formed in the closed magnetic path so as to change the flow of magnetic flux in the closed magnetic path or change the route of the eddy current, thereby attaining a reduction in core loss. Further, even in the case where magnetic insulation is effected, there is no reduction in the effective recording efficiency, that is, the ratio between the inductance and the magnetization efficiency, and, by increasing the number of turns of the coil, the same level of magnetic field strength as in the prior art can be attained.

In the third aspect of the present invention, the back core can be fastened by adhesion after the bobbin having a coil wound around it has been fitted onto the main core. Since a bobbin can be used, the assembly operation for the magnetic head is facilitated.

In the fourth aspect of the present invention, the heat generated in the main core is dissipated into the air by heat dissipating members, so that, even in the case of a structure in which the core is embedded in a ceramic slider or the like, the heat generation in the core can be effectively suppressed.

In the fifth aspect of the present invention, the heat dissipating members are formed of a sheet material, and fitted into the gap between the outer surface of the main core and the inner surface of the bobbin, whereby the heat dissipating members can be reliably brought into contact with the main core solely by an inserting operation.

In the sixth aspect of the present invention, the bobbin is formed as a heat dissipating member made of a heat dissipating material, such as aluminum alloy, aluminum nitride (Al—N), or SiC, thereby eliminating the need to provide a separate heat dissipating member.

What is claimed is:

1. A magnetic head apparatus comprising:

an elongated main core extending in a longitudinal direction, the elongated main core including first and second parallel portions extending in the longitudinal direction;

first and second side cores mounted on opposing sides of the main core such that the first portion of the main core and the first side core form a first gap, and the second portion of the main core and the second side core form a second gap; and a coil formed around the main core for generating a magnetic field in a closed magnetic path extending via the main and side cores, wherein the first and second portions of said main core are electrically insulated by an electrical insulating layer extending in the longitudinal direction.

2. A magnetic head apparatus of the type which includes main and side cores forming a gap, a back core joined to the main and side cores, and a coil for generating a magnetic field in a closed magnetic path extending via the main, side and back cores, wherein at least one of the main core and the side cores are joined to the back core through the intermediation of one of a non-magnetic layer and an electrical insulating layer.

3. A magnetic head apparatus according to claim 2, wherein the back core is glued to the main and side cores by means of an adhesive that constitutes one of the non-magnetic layer and the electrically insulating layer, with a bobbin which has a coil wound around it having been fitted onto said main core.

4. A magnetic head apparatus comprising:

an elongated main core extending in a longitudinal direction;

first and second side cores mounted on opposing sides of the main core such that the main core and the first side core form a first gap, and the main core and the second side core form a second gap; and a coil formed around the main core for generating a magnetic field in a closed magnetic path extending via the main and side cores, wherein a heat dissipating member is provided which is directly joined to said main core, wherein a bobbin having a coil wound around it is fitted onto said main core, and wherein a heat dissipating member formed of a sheet material is fitted into a gap between the outer surface of the main core and the inner surface of a hole in the bobbin.

5. The magnetic head apparatus according to claim 1, wherein the first and second gaps are located at a first end of the elongated main core, and the apparatus further comprising a back core connected to a second end of the main core and to the first and second side cores.

6. The magnetic head apparatus according to claim 1, wherein the electrical insulating layer comprising one of glass and an epoxy resin, and wherein the electrical insulating layer has a width of at least 0.1 μm.

* * * * *